(12) United States Patent
Vignali et al.

(10) Patent No.: US 9,278,759 B2
(45) Date of Patent: Mar. 8, 2016

(54) CABIN AIR COMPRESSOR CROSS-SUPPORT BRACKET

(71) Applicant: Hamilton Sundstrand Corporation, Windsor Locks, CT (US)

(72) Inventors: Mark Vignali, Northfield, CT (US); Luke J. Mayo, Coventry, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 201 days.

(21) Appl. No.: 13/901,831

(22) Filed: May 24, 2013

(65) Prior Publication Data

US 2014/0346302 A1 Nov. 27, 2014

(51) Int. Cl.
*F16M 11/00* (2006.01)
*B64D 13/02* (2006.01)
*B64D 13/00* (2006.01)

(52) U.S. Cl.
CPC ............. *B64D 13/02* (2013.01); *B64D 13/00* (2013.01); *Y10T 29/49826* (2015.01)

(58) Field of Classification Search
CPC ...... Y10T 29/49826; F16M 7/00; F16M 9/00; F16M 3/00; F16M 3/02; B64D 13/02; B64D 13/00
USPC .......... 248/200, 300, 309.1, 647, 637; 244/54
See application file for complete search history.

(56) References Cited

U.S. PATENT DOCUMENTS

| | | | |
|---|---|---|---|
| 2,883,135 A * | 4/1959 | Smalley | H01F 27/06 248/230.5 |
| 5,439,189 A | 8/1995 | Wiley et al. | |
| 5,954,309 A | 9/1999 | Kato et al. | |
| 6,270,051 B1 | 8/2001 | Power | |
| 7,134,252 B2 | 11/2006 | Thompson | |
| 7,516,621 B2 | 4/2009 | Suttie et al. | |
| 7,637,521 B2 | 12/2009 | Grant | |
| 7,810,295 B2 | 10/2010 | Thompson | |
| 7,909,286 B2 | 3/2011 | Rueda et al. | |
| 8,028,671 B1 | 10/2011 | Grozich | |
| 8,813,457 B2 | 8/2014 | Underkofler et al. | |
| 2010/0044540 A1 * | 2/2010 | Knudsen | F03D 1/005 248/226.11 |
| 2014/0151518 A1 | 6/2014 | Vignali et al. | |

OTHER PUBLICATIONS

U.S. Appl. No. 13/901,811 Notice of Allowance dated Jun. 2, 2015, 8 pages.

* cited by examiner

*Primary Examiner* — Christopher Garft
(74) *Attorney, Agent, or Firm* — Cantor Colburn LLP

(57) ABSTRACT

A cross-support bracket for a cabin air compressor assembly includes a mating portion having a first group of apertures at a first end and a second group of apertures at a second end. A reference line is defined between a lowermost primary aperture of the first group of apertures and a lowermost primary aperture of the second group of apertures. A stiffener portion is formed along a lower edge of the mating portion. A curved region is formed in the mating portion between a first and second upper edge of the mating portion. The curved region includes a first curved portion, a substantially straight portion, and a second curved portion. A ratio of a radius of the first and second curved portions of the curved region to a length from the substantially straight portion to the reference line is between 9.06 and 10.19.

14 Claims, 6 Drawing Sheets

CABIN AIR COMPRESSOR CROSS-SUPPORT BRACKET

BACKGROUND OF THE INVENTION

The subject matter disclosed herein relates to aircraft environmental control. More specifically, the subject disclosure relates to a cross-support bracket of a cabin air compressor for an aircraft environmental control system.

Environmental control systems (ECSs) are utilized on various types of aircraft for several purposes, such as in cooling systems for the aircraft. For example, components of an ECS may be utilized to remove heat from various aircraft lubrication and electrical systems and/or used to condition aircraft cabin air. A cabin air conditioning and temperature control system (CACTCS) is an example of an aircraft ECS that includes air cycle packs supplied with pressurized outside (fresh) air from electric motor-driven cabin air compressors (CACs) which condition fresh air for cabin heating and cooling. The CACTCS provides flow control for modulation of cooling pack air flow, recirculation fans to circulate cabin air, and associated valves and sensors used for system control.

The CACTCS may also include a trim air system to provide individual cabin zone temperature control. This includes trim temperature control valves, trim duct heaters and associated sensors. As one example, a CACTCS may provide control of six baseline passenger zones and a flight deck zone. Additional zones, such as a forward cargo zone, a crew zone and/or an attendant zone may be controlled by other ECSs. Recirculation fans may also be provided for additional air flow to the passenger cabin and to ensure that flow at an air distribution nozzle remains constant.

Various elements of aircraft ECSs can experience harsh environments including a wide range of temperatures, pressures, and vibrations. Elements of aircraft ECSs must also fit within a compact space and minimize weight while providing adequate strength to handle typical and peak stresses over the anticipated life of the elements.

BRIEF DESCRIPTION OF THE INVENTION

According to one aspect, a cross-support bracket for a cabin air compressor assembly is provided. The cross-support bracket includes a mating portion having a first group of apertures at a first end and a second group of apertures at a second end. A reference line is defined between a lowermost primary aperture of the first group of apertures and a lowermost primary aperture of the second group of apertures. A stiffener portion is formed along a lower edge of the mating portion. A curved region is formed in the mating portion between a first and second upper edge of the mating portion. The curved region includes a first curved portion, a substantially straight portion, and a second curved portion. A ratio of a radius of the first and second curved portions of the curved region to a length from the substantially straight portion to the reference line is between 9.06 and 10.19.

According to another aspect, a cabin air compressor support assembly is provided that includes a left-hand cabin air compressor support bracket coupled to a cabin air compressor assembly, a cross-support bracket, and an upper three-way mount. The cabin air compressor support assembly also includes a right-hand cabin air compressor support bracket coupled to the cabin air compressor assembly, the cross-support bracket, and a lower three-way mount. The cross-support bracket includes a mating portion having a first group of apertures at a first end and a second group of apertures at a second end. A reference line is defined between a lowermost primary aperture of the first group of apertures and a lowermost primary aperture of the second group of apertures. A stiffener portion is formed along a lower edge of the mating portion. A curved region is formed in the mating portion between a first and second upper edge of the mating portion. The curved region includes a first curved portion, a substantially straight portion, and a second curved portion. A ratio of a radius of the first and second curved portions of the curved region to a length from the substantially straight portion to the reference line is between 9.06 and 10.19.

According to a further aspect, a method of installing a cross-support bracket in a cabin air conditioning and temperature control system is provided. The method includes coupling a mating portion of the cross-support bracket at a first group of apertures at a first end to a support bracket of the cabin air conditioning and temperature control system. The method also includes coupling the mating portion of the cross-support bracket at a second group of apertures at a second end to another support bracket of the cabin air conditioning and temperature control system. A reference line is defined between a lowermost primary aperture of the first group of apertures and a lowermost primary aperture of the second group of apertures. A stiffener portion is formed along a lower edge of the mating portion. A curved region is formed in the mating portion between a first and second upper edge of the mating portion. The curved region includes a first curved portion, a substantially straight portion, and a second curved portion. A ratio of a radius of the first and second curved portions of the curved region to a length from the substantially straight portion to the reference line is between 9.06 and 10.19.

DETAILED DESCRIPTION OF THE INVENTION

Figure 1:
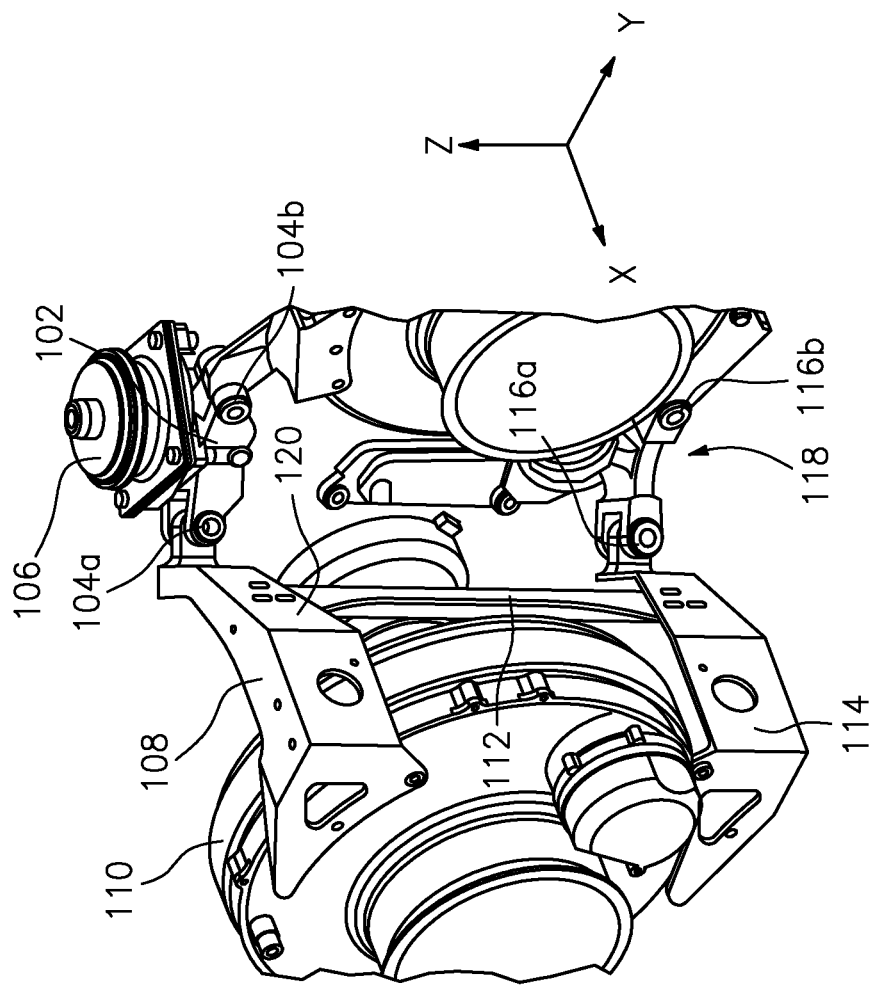
FIG. 1 is a partial perspective view of a cabin air conditioning and temperature control system.
Figure 2:
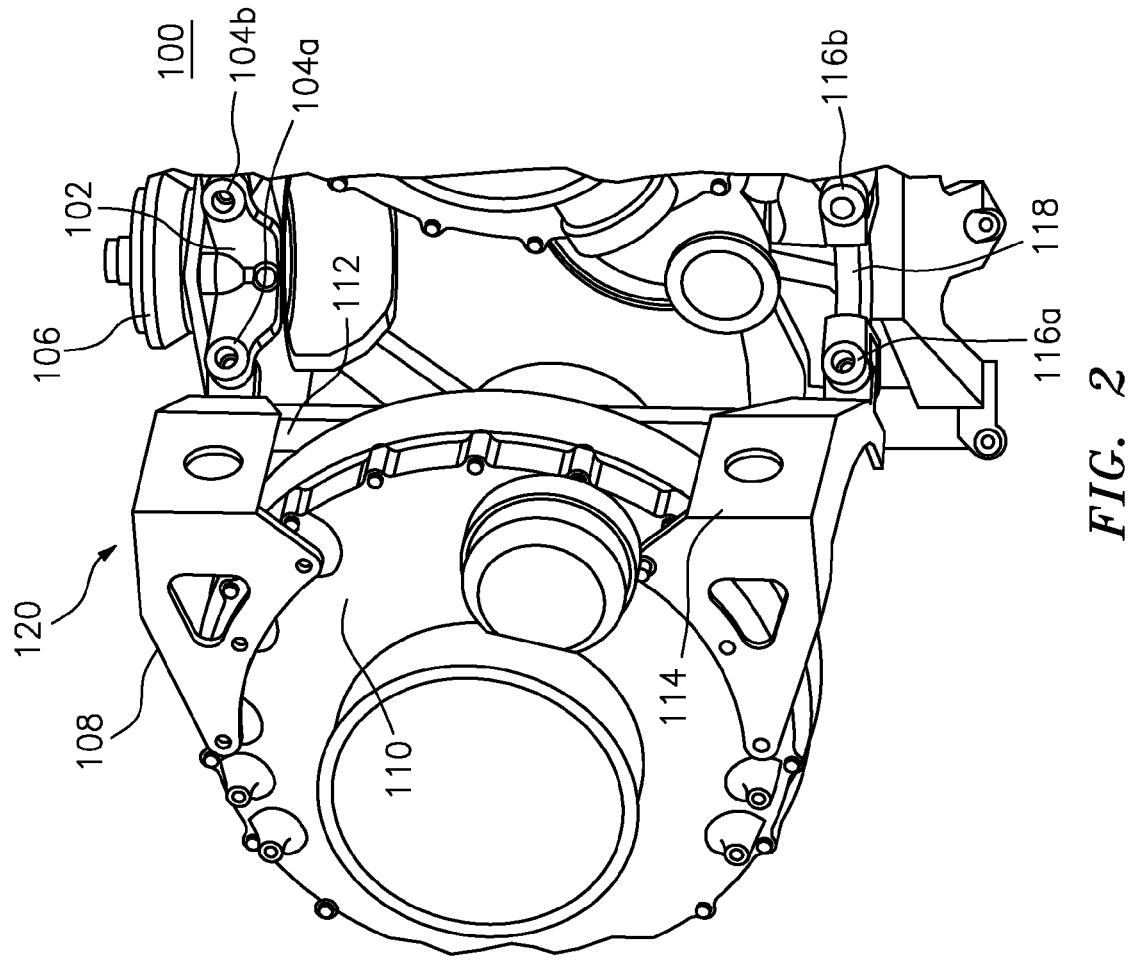
FIG. 2 is another partial perspective view of the cabin air conditioning and temperature control system of FIG. 1.

Shown in FIGS. 1 and 2 are partial perspective views of a cabin air conditioning and temperature control system (CACTCS) 100. The CACTCS 100 includes an upper three-way mount 102 with coupling points 104a and 104b. The upper three-way mount 102 may also be coupled to one or more vibration isolators 106. The coupling point 104a is coupled to a first cabin air compressor (CAC) support bracket 108. The first CAC support bracket 108 is coupled to a CAC 110 and a cross-support bracket 112. The cross-support bracket 112, also referred to as CAC cross-support bracket 112, is coupled to a second CAC support bracket 114. The second CAC support bracket 114 is coupled to the CAC 110 and a coupling point 116a of a lower three-way mount 118 as best viewed in FIG. 2. Similar to the upper three-way mount 102, the lower three-way mount 118 includes a pair of coupling points 116a and 116b. The first CAC support bracket 108, the cross-support bracket 112, and the second CAC support bracket 114 collectively form a CAC support assembly 120. The first CAC support bracket 108 may also be referred to as a left-hand CAC support bracket, and the second CAC support bracket 114 may be referred to as a right-hand CAC support bracket. The coupling points 104b and 116b may be used to support a second CAC (not depicted), where the CAC 110 may be referred to as an outer CAC and the second CAC (not depicted) may be referred to an inner CAC. The three-way mounts 102 and 118 limit CAC movement in three directions (X-Y-Z).

Figure 3:
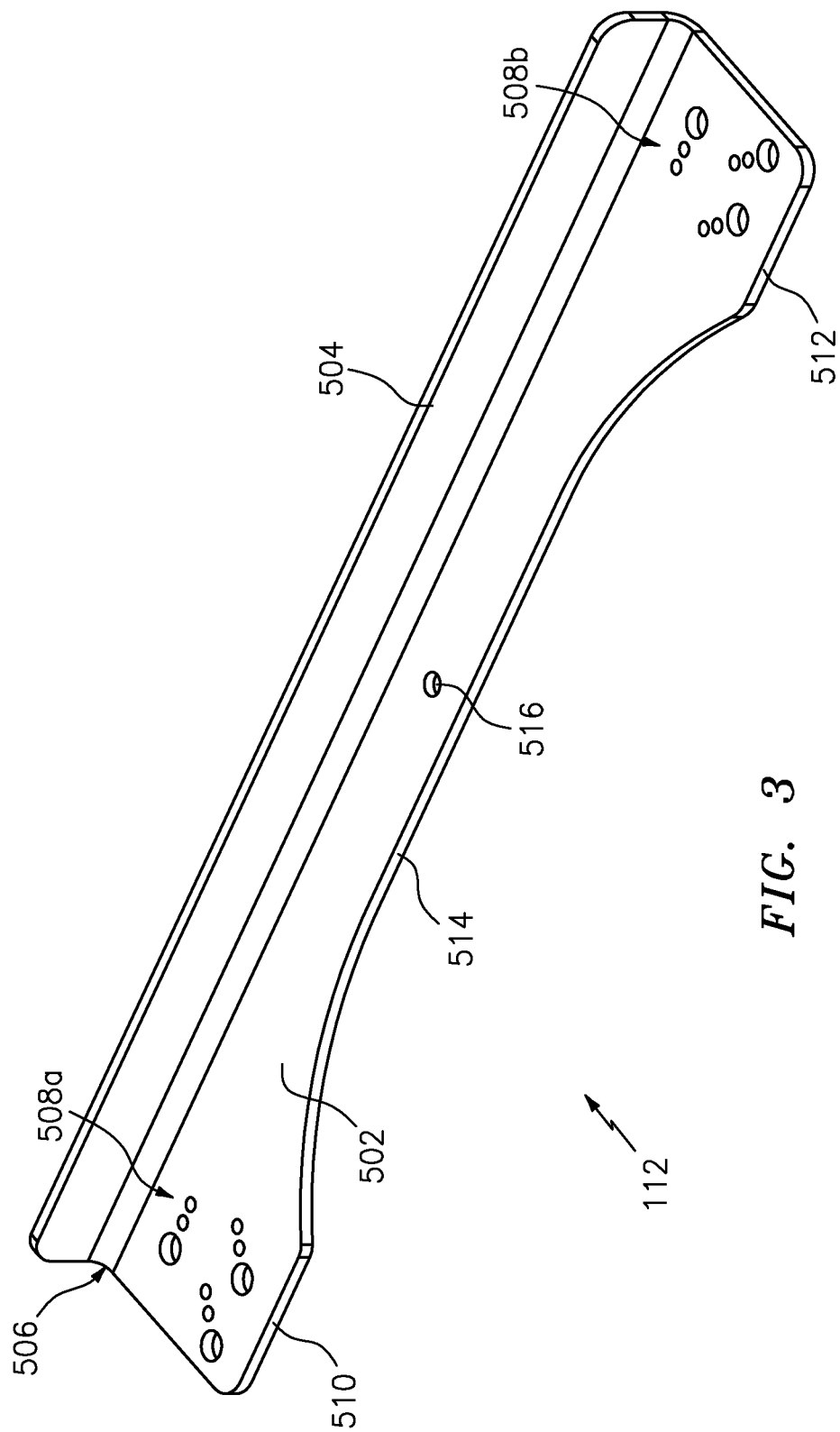
FIG. 3 is a perspective view of a cabin air compressor cross-support bracket.

FIG. 3 is a perspective view of the cross-support bracket 112 of FIG. 1. The cross-support bracket 112 includes a mating portion 502 and a stiffener portion 504 formed along a bended edge 506 of the mating portion 502. The mating portion 502 includes a first group of apertures 508a at a first end 510 and a second group of apertures 508b at a second end 512. The mating portion 502 includes a curved region 514. A wire guide aperture 516 is positioned on the mating portion 502 between the bended edge 506 and the curved region 514.

Figure 4:
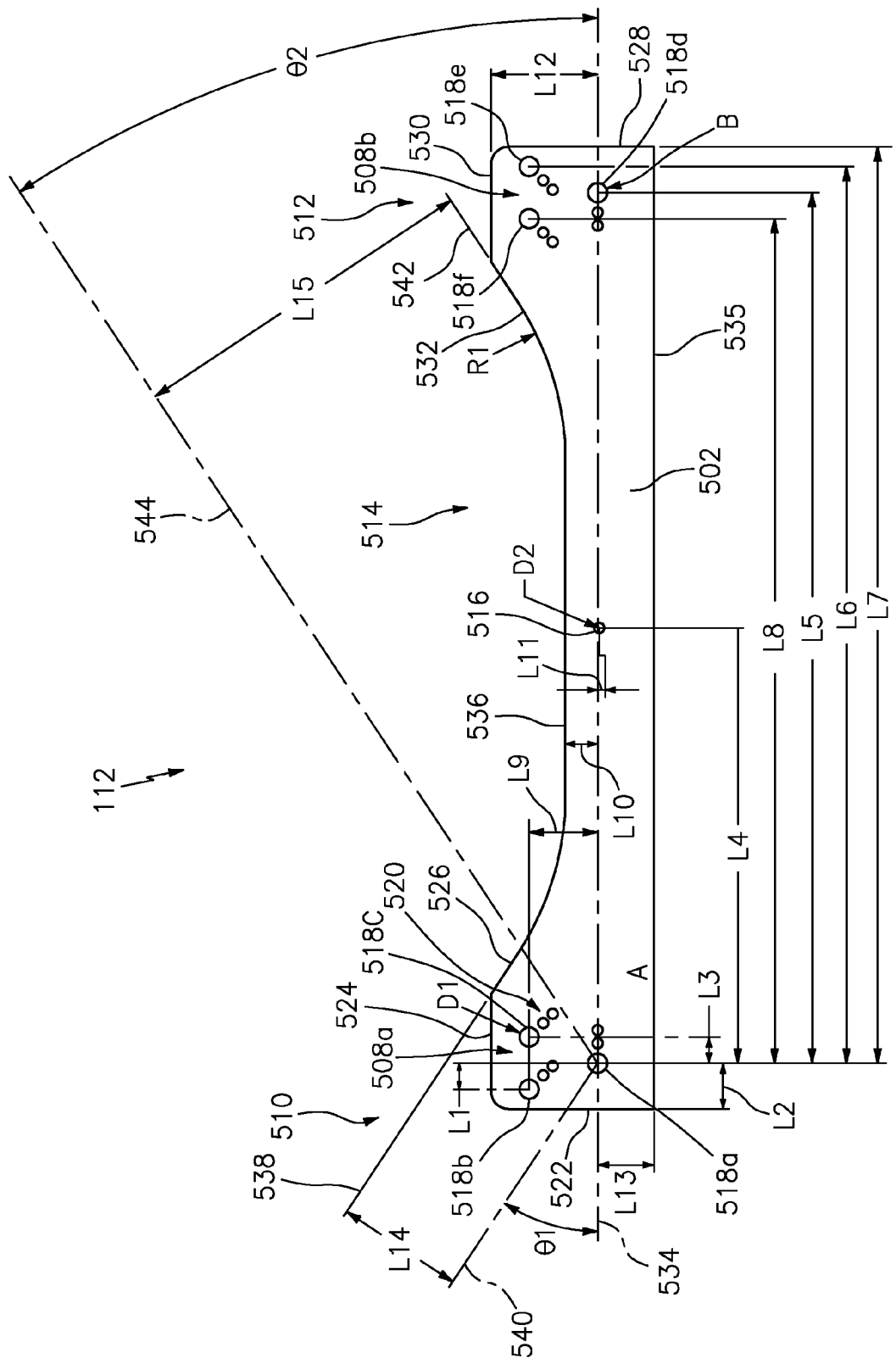
FIG. 4 is another view of the cabin air compressor cross-support bracket of FIG. 3.

FIG. 4 is another view of the cross-support bracket 112 of FIG. 3, where the stiffener portion 504 is not visible. The first group of apertures 508a at the first end 510 includes three primary apertures 518a, 518b, and 518c. The group of apertures 508b at the second end 512 includes three primary apertures 518d, 518e, and 518f. Each of the primary apertures 518a-518f has a diameter D1 of about 0.386 inches (0.980 cm). Each of the primary apertures 518a-518f also has an adjacent pair of mounting holes 520.

Primary aperture 518a is the lowermost of the first group of apertures 508a, where the center of primary aperture 518a is defined as datum A for defining a number of dimensions. Primary aperture 518b is proximate a first outer edge 522 and a first upper edge 524 of the first end 510 and is centered at a length L1 of about 0.513 inches (1.303 cm) from datum A. The first outer edge 522 is at a length L2 of about 0.915 inches (2.324 cm) from datum A. Primary aperture 518c is proximate a first curved portion 526 of the curved region 514 and the first upper edge 524 of the first end 510. The primary aperture 518c is centered at a length L3 of about 0.512 inches (1.300 cm) from datum A. The wire guide aperture 516 is centered at a length L4 of about 8.76 inches (22.25 cm) from datum A. The wire guide aperture 516 has a diameter D2 of about 0.282 inches (0.716 cm).

Primary aperture 518d is the lowermost of the second group of apertures 508b, where the center of primary aperture 518d is defined as datum B. Datum B is at a length L5 of about 17.52 inches (44.50 cm) from datum A. Primary aperture 518e is proximate a second outer edge 528 and a second upper edge 530 of the second end 512 and is centered at a length L6 of about 18.035 inches (45.809 cm) from datum A. The second outer edge 528 is at a length L7 of about 18.435 inches (46.825 cm) from datum A. Primary aperture 518f is proximate a second curved portion 532 of the curved region 514 and the second upper edge 530 of the second end 512. The primary aperture 518f is centered at a length L8 of about 17.01 inches (43.205 cm) from datum A.

A reference line 534 is defined between datum A and datum B. Each of the primary apertures 518b, 518c, 518e, and 518f is offset by a length L9 of about 1.375 inches (3.493 cm) from the reference line 534. A substantially straight portion 536 of the curved region 514 is offset by a length L10 of about 0.625 inches (1.588 cm) from the reference line 534. A length L11 of about 0.03 inches (0.076 cm) below the reference line 534 defines a variable placement region for placement of the wire guide aperture 516. The first and second upper edges 524 and 530 are offset by a length L12 of about 2.125 inches (5.398 cm) from the reference line 534. The reference line 534 is offset by a length L13 of about 1.125 inches (2.858 cm) from a lower edge 535 of the mounting portion 502.

Curvature of the curved region 514 is defined by the first and second curved portions 526 and 532. In an embodiment, the first and second curved portions 526 and 532 both have a radius R1 of about 6.0 inches (15.24 cm). A reference line 538 is defined as an extension of the first curved portion 526 beyond the first upper edge 524. Another reference line 540 is defined extending from datum A and substantially parallel to the reference line 538. A length L14 of about 2.54 inches (6.45 cm) is defined between reference lines 538 and 540. Reference line 540 is offset by an angle Θ1 of about 33 degrees relative to reference line 534. A reference line 542 is defined as an extension of the second curved portion 532 beyond the second upper edge 530. Another reference line 544 is defined extending from datum A and substantially parallel to the reference line 542. A length L15 of about 7.0 inches (17.78 cm) is defined between reference lines 542 and 544. Reference line 544 is offset by an angle Θ2 of about 33 degrees relative to reference line 534.

Figure 5:
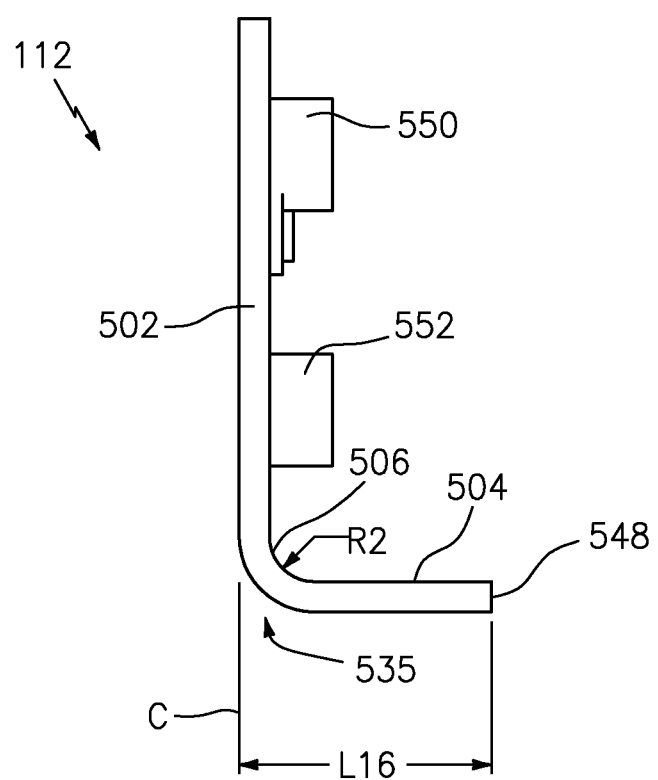
FIG. 5 is a side view of the cabin air compressor cross-support bracket of FIG. 3.

FIG. 5 is a side view of the cross-support bracket 112 of FIG. 3 with nut plates 550 and 552. The nut plates 550 are oriented at an angle to align with the primary apertures 518b, 518c, 518e, and 518f of FIG. 4. The nut plates 552 are aligned with primary apertures 518a and 518d. The nut plates 550 and 552 are coupled to the mating portion 502 on a same side as the stiffener 504. A datum C is defined on an opposite side of the mating portion 502. A length L16 of the stiffener portion 504 at the lower edge 535 is defined between a stiffener portion edge 548 and datum C. The length L16 is about 1.375 inches (3.493 cm). A radius R2 of the bended edge 506 between the mating portion 502 and the stiffener portion 504 is about 0.25 inches (0.635 cm).

Figure 6:
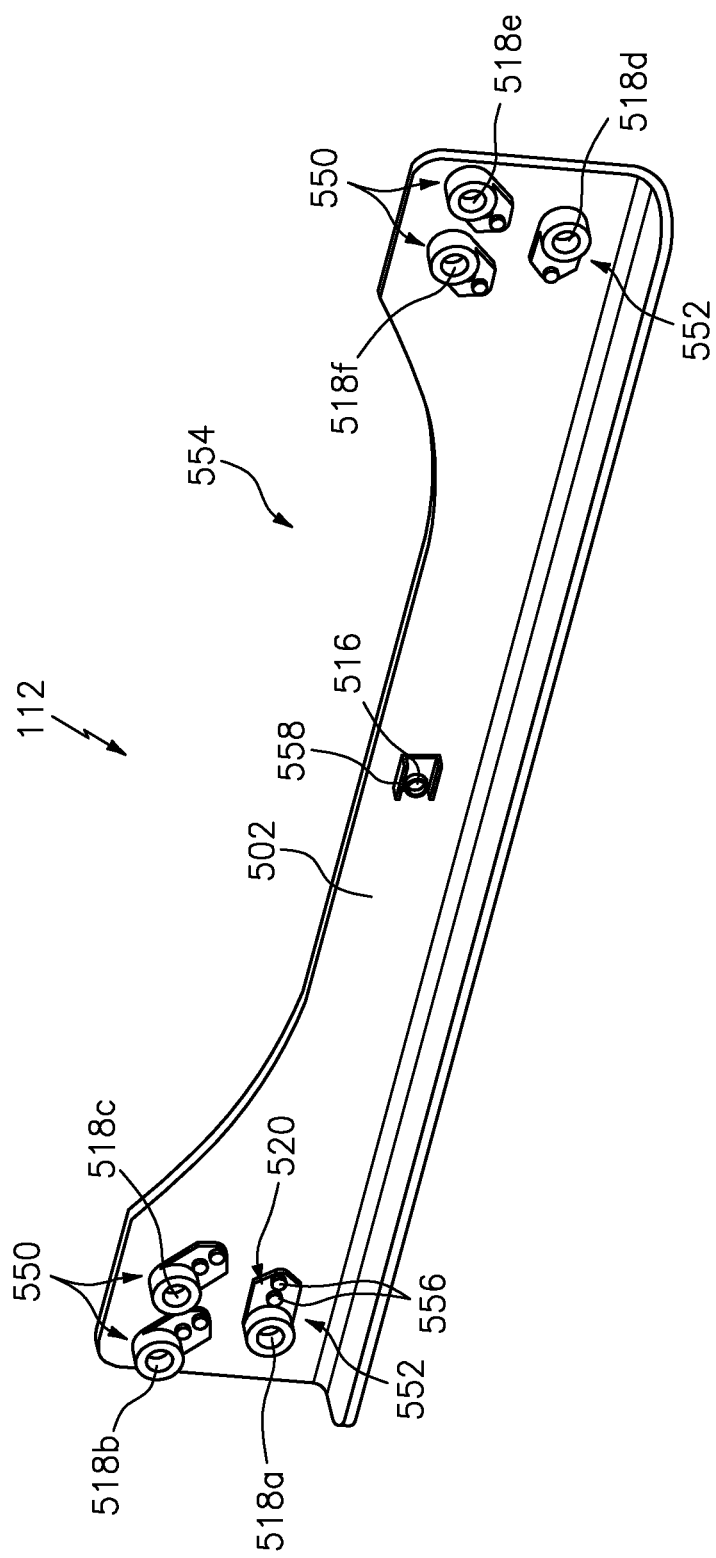
FIG. 6 is a view of a cabin air compressor cross-support bracket assembly.

FIG. 6 is a view of a cabin air compressor cross-support bracket assembly 554 that includes the cross-support bracket 112. As can be seen in FIG. 6, each of the nut plates 550 aligns with one of the primary apertures 518b, 518c, 518e, and 518f, and each of the nut plates 552 aligns with one of the primary apertures 518a and 518d. The nut plates 550 and 552 may be coupled to the mating portion 502 through pairs of mounting holes 520 using fasteners 556. The fasteners 556 may be rivets. Nut plates 550 and 552 may be configured as self-locking nuts to secure the cross-support bracket 112 to the first and second CAC support brackets 108 and 114. A nut plate 558 may also be installed at the wire guide aperture 516 to support wiring (not depicted) and a wire clamp (not depicted) through the mating portion 502 of the cross-support bracket 112.

A number of ratios are defined between elements of the cross-support bracket 112 as depicted in FIGS. 1-6. In an embodiment, a ratio of radius R1 of the first and second curved portions 526 and 532 of the curved region 514 to length L10 from the substantially straight portion 536 of the curved region 514 to the reference line 534 is between 9.06 and 10.19. A ratio of the first length L1 from first primary aperture 518a to second primary aperture 518b relative to the second length L2 from the first primary aperture 518a to the first outer edge 522 is between 0.51 and 0.62. A ratio of the third length L3 from the first primary aperture 518a to the third primary aperture 518c relative to the second length L2 is between 0.51 and 0.62. A ratio of length L4 to L7 is between 0.472 and 0.478. A ratio of length L9 from the second and third primary apertures 518b and 518c to the reference line 534 relative to the length L13 from the reference line 534 to the lower edge 535 is between 1.16 and 1.29. A ratio of the length L12 from the first and second upper edges 524 and 530 to the reference line 534 relative to the length L13 from the reference line 534 to the lower edge 535 is between 1.81 and 1.97. A ratio of the length L6 from the first primary aperture 518a to the fifth primary aperture 518e relative to the length L5 from the first primary aperture 518a to the fourth primary aperture 518d is between 1.02 and 1.04. A ratio of the length L8 from the first primary aperture 518a to the sixth primary aperture 518f relative to the length L7 from the first primary aperture 518a to the second outer edge 528 is between 0.91 and 0.93. A ratio of length L15 to L14 is between 2.71 and 2.81. A ratio of a diameter D1 of the lowermost primary aperture 518a of the first group 508a to a diameter D2 of the wire guide aperture 516 is between 1.31 and 1.43.

A process of installing the CAC cross-support bracket 112 in the cabin air conditioning and temperature control system 100 is described in reference to FIGS. 1-6. The mating portion 502 of the cross-support bracket 112 at the first group of apertures 508a at the first end 510 is coupled to a support bracket, such as the CAC support bracket 114 of the cabin air conditioning and temperature control system 100. The mating portion 502 of the cross-support bracket 112 at the second group of apertures 508b at the second end 512 is coupled to another support bracket, such as the CAC support bracket 108 of the cabin air conditioning and temperature control system 100. Coupling may be performed by fasteners (not depicted) through nut plates 550 and 552. Wiring and wire clamp (not depicted) can also be supported at the nut plate 558 installed at the wire guide aperture 516 of the cross-support bracket 112. As previously described, a reference line 534 is defined between a lowermost primary aperture 518a of the first group of apertures 508a and a lowermost primary aperture 518d of the second group of apertures 508b. The cross-support bracket 112 includes the stiffener portion 504 formed along a lower edge 535 of the mating portion 502 and curved region 514 formed in the mating portion 502 between the first and second upper edge 524 and 530 of the mating portion 502. The curved region 514 includes the first curved portion 526, the substantially straight portion 536, and the second curved portion 532. In an embodiment, a ratio of the radius R1 of the first and second curved portions 526 and 532 of the curved region 514 to the length L10 from the substantially straight portion 536 to the reference line 534 is between 9.06 and 10.19.

The CAC support bracket 108 is coupled to the CAC 110 and to the coupling point 104a of the upper three-way mount 102. The CAC support bracket 114 is coupled to the CAC 110 and to the coupling point 116a of the lower three-way mount 118. CAC support brackets 108 and 114 may be coupled to structures of the cabin air conditioning and temperature control system 100 before or after coupling to the cross-support bracket 112.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A cross-support bracket for a cabin air compressor assembly, the cross-support bracket comprising:
    a mating portion comprising a first group of apertures at a first end and a second group of apertures at a second end, wherein a reference line is defined between a lowermost primary aperture of the first group of apertures and a lowermost primary aperture of the second group of apertures;
    a stiffener portion formed along a lower edge of the mating portion; and
    a curved region formed in the mating portion between a first and second upper edge of the mating portion, the curved region comprising a first curved portion, a substantially straight portion, and a second curved portion, wherein a ratio of a radius of the first and second curved portions of the curved region to a length from the substantially straight portion to the reference line is between 9.06 and 10.19, wherein the first group of apertures comprises a first primary aperture being the lowermost primary aperture of the first group, a second primary aperture proximate a first outer edge and the first upper edge of the first end, and a third primary aperture proximate the first curved portion of the curved region and the first upper edge of the first end, and further wherein a ratio of a first length from the first primary aperture to the second primary aperture relative to a second length from the first primary aperture to the first outer edge is between 0.51 and 0.62, and a ratio of a third length from first primary aperture to the third primary aperture relative to the second length is between 0.51 and 0.62.

2. The cross-support bracket of claim 1, wherein a ratio of a length from the second and third primary apertures to the reference line relative to a length from the reference line to the lower edge is between 1.16 and 1.29, and a ratio of a length from the first and second upper edges to the reference line relative to the length from the reference line to the lower edge is between 1.81 and 1.97.

3. The cross-support bracket of claim 1, wherein the second group of apertures comprises a fourth primary aperture being the lowermost primary aperture of the second group, a fifth primary aperture proximate a second outer edge and the second upper edge of the second end, and a sixth primary aperture proximate the second curved portion of the curved region and the second upper edge of the second end.

4. The cross-support bracket of claim 3, wherein a ratio of a length from the first primary aperture to the fifth primary aperture relative to a length from the first primary aperture to the fourth primary aperture is between 1.02 and 1.04, and a ratio of a length from the first primary aperture to the sixth primary aperture relative to a length from the first primary aperture to the second outer edge is between 0.91 and 0.93.

5. The cross-support bracket of claim 1, wherein the mating portion further comprises a wire guide aperture positioned between the lower edge and the substantially straight portion of the curved region, and a ratio of a diameter of the lowermost primary aperture of the first group to a diameter of the wire guide aperture is between 1.31 and 1.43.

6. A cabin air compressor support assembly comprising:
    a left-hand cabin air compressor support bracket coupled to a cabin air compressor assembly, a cross-support bracket, and an upper three-way mount; and
    a right-hand cabin air compressor support bracket coupled to the cabin air compressor assembly, the cross-support bracket, and a lower three-way mount, the cross-support bracket comprising:
        a mating portion comprising a first group of apertures at a first end and a second group of apertures at a second end, wherein a reference line is defined between a lowermost primary aperture of the first group of apertures and a lowermost primary aperture of the second group of apertures;
a stiffener portion formed along a lower edge of the mating portion; and
a curved region formed in the mating portion between a first and second upper edge of the mating portion, the curved region comprising a first curved portion, a substantially straight portion, and a second curved portion, wherein a ratio of a radius of the first and second curved portions of the curved region to a length from the substantially straight portion to the reference line is between 9.06 and 10.19, wherein the first group of apertures comprises a first primary aperture being the lowermost primary aperture of the first group, a second primary aperture proximate a first outer edge and the first upper edge of the first end, and a third primary aperture proximate the first curved portion of the curved region and the first upper edge of the first end, and further wherein a ratio of a first length from the first primary aperture to the second primary aperture relative to a second length from the first primary aperture to the first outer edge is between 0.51 and 0.62, and a ratio of a third length from first primary aperture to the third primary aperture relative to the second length is between 0.51 and 0.62.

7. The cabin air compressor support assembly of claim 6, wherein a ratio of a length from the second and third primary apertures to the reference line relative to a length from the reference line to the lower edge is between 1.16 and 1.29, and a ratio of a length from the first and second upper edges to the reference line relative to the length from the reference line to the lower edge is between 1.81 and 1.97.

8. The cabin air compressor support assembly of claim 6, wherein the second group of apertures comprises a fourth primary aperture being the lowermost primary aperture of the second group, a fifth primary aperture proximate a second outer edge and the second upper edge of the second end, and a sixth primary aperture proximate the second curved portion of the curved region and the second upper edge of the second end.

9. The cabin air compressor support assembly of claim 8, wherein a ratio of a length from the first primary aperture to the fifth primary aperture relative to a length from the first primary aperture to the fourth primary aperture is between 1.02 and 1.04, and a ratio of a length from the first primary aperture to the sixth primary aperture relative to a length from the first primary aperture to the second outer edge is between 0.91 and 0.93.

10. The cabin air compressor support assembly of claim 6, wherein the mating portion further comprises a wire guide aperture positioned between the lower edge and the substantially straight portion of the curved region, and a ratio of a diameter of the lowermost primary aperture of the first group to a diameter of the wire guide aperture is between 1.31 and 1.43.

11. A method of installing a cross-support bracket in a cabin air conditioning and temperature control system comprising:

coupling a mating portion of the cross-support bracket at a first group of apertures at a first end to a support bracket of the cabin air conditioning and temperature control system; and
coupling the mating portion of the cross-support bracket at a second group of apertures at a second end to another support bracket of the cabin air conditioning and temperature control system, wherein a reference line is defined between a lowermost primary aperture of the first group of apertures and a lowermost primary aperture of the second group of apertures, the cross-support bracket further comprising a stiffener portion formed along a lower edge of the mating portion and a curved region formed in the mating portion between a first and second upper edge of the mating portion, the curved region comprising a first curved portion, a substantially straight portion, and a second curved portion, wherein a ratio of a radius of the first and second curved portions of the curved region to a length from the substantially straight portion to the reference line is between 9.06 and 10.19, wherein the first group of apertures comprises a first primary aperture being the lowermost primary aperture of the first group, a second primary aperture proximate a first outer edge and the first upper edge of the first end, and a third primary aperture proximate the first curved portion of the curved region and the first upper edge of the first end, and further wherein a ratio of a first length from the first primary aperture to the second primary aperture relative to a second length from the first primary aperture to the first outer edge is between 0.51 and 0.62, and a ratio of a third length from first primary aperture to the third primary aperture relative to the second length is between 0.51 and 0.62.

12. The method of claim 11, wherein a ratio of a length from the second and third primary apertures to the reference line relative to a length from the reference line to the lower edge is between 1.16 and 1.29, and a ratio of a length from the first and second upper edges to the reference line relative to the length from the reference line to the lower edge is between 1.81 and 1.97.

13. The method of claim 11, wherein the second group of apertures comprises a fourth primary aperture being the lowermost primary aperture of the second group, a fifth primary aperture proximate a second outer edge and the second upper edge of the second end, and a sixth primary aperture proximate the second curved portion of the curved region and the second upper edge of the second end, and further wherein a ratio of a length from the first primary aperture to the fifth primary aperture relative to a length from the first primary aperture to the fourth primary aperture is between 1.02 and 1.04, and a ratio of a length from the first primary aperture to the sixth primary aperture relative to a length from the first primary aperture to the second outer edge is between 0.91 and 0.93.

14. The method of claim 11, wherein the mating portion further comprises a wire guide aperture positioned between the lower edge and the substantially straight portion of the curved region, and a ratio of a diameter of the lowermost primary aperture of the first group to a diameter of the wire guide aperture is between 1.31 and 1.43.

* * * * *